United States Patent

Fetzer et al.

Patent Number: 6,069,737
Date of Patent: May 30, 2000

[54] OPTICAL ARRANGEMENT WITH A DIFFRACTIVE OPTICAL ELEMENT

[75] Inventors: Günter Fetzer, Gundelfingen; Gerhard Alt, Sexau, both of Germany

[73] Assignee: Sick AG, Waldkirch, Germany

[21] Appl. No.: 08/854,960

[22] Filed: May 13, 1997

[30] Foreign Application Priority Data

May 14, 1996 [DE] Germany ............... 196 19 478

[51] Int. Cl.⁷ .................................................. G02B 5/18
[52] U.S. Cl. ..................... 359/558; 359/563; 359/565; 359/576; 359/465; 359/489
[58] Field of Search .................... 359/558, 563, 359/565, 576, 465, 489

[56] References Cited

U.S. PATENT DOCUMENTS

| 3,213,753 | 10/1965 | Rogers . |
| 4,990,768 | 2/1991 | Ito . |
| 5,033,829 | 7/1991 | Fetzer et al. ............... 359/489 |
| 5,223,978 | 6/1993 | Burkhart . |
| 5,410,563 | 4/1995 | Nakamura . |
| 5,555,129 | 9/1996 | Konno . |

FOREIGN PATENT DOCUMENTS

| 0659531A1 | 6/1995 | European Pat. Off. . |
| 0698804A2 | 2/1996 | European Pat. Off. . |
| 4304343A1 | 8/1994 | Germany . |
| 6-317764 | 11/1994 | Japan . |
| 6317764 | 11/1994 | Japan . |
| WO 93/21548 | 10/1993 | WIPO . |

OTHER PUBLICATIONS

Patent Abstracts of Japan vol. 011, No. 015 (P–536), Jan. 16, 1987 & JP 61 189504 A (Matsushita Electric Ind Co Ltd), Aug. 23, 1986, Abstract; Figures.

Patent Abstracts of Japan vol. 008, No. 159 (P–289), Jul. 24, 1984 & JP 59 057205 A (Fujitsu KK), Apr. 2, 1984, Abstract; Figures.

Patent Abstracts of Japan vol. 016, No. 100 (P–1323), Mar. 11, 1992 & JP 03 278002 A (Omron Corp), Dec. 9, 1991, Abstract; Figure.

Patent Abstracts of Japan, vol. 011, No. 015 (P–536), Jan. 16, 1987 & JP 61 189504 A (Matsushita Electric Ind Co Ltd), Aug. 23, 1986, abstract, figures.

Patent Abstracts of Japan, vol. 008, No. 159 (P–289), Jul. 24, 1984 & JP 59 057205 A (Fujitsu KK), Apr. 2, 1984, abstract; figures.

Patent Abstracts of Japan, vol. 016, No. 100 (P–1323), Mar. 11, 1992 & JP 03 278002 A (Omron Corp), Dec. 9, 1991, abstract; figure.

Patent Abstracts of Japan, vol. 010, No. 135 (P–457), May 20, 1986 & JP 60 257420 A (Matsushita Denki Sangyo KK), Dec. 19, 1985, abstract.

*Primary Examiner*—Cassandra Spyrou
*Assistant Examiner*—Craig Curtis
*Attorney, Agent, or Firm*—Townsend and Townsend and Crew LLP

[57] ABSTRACT

An optical arrangement, in particular for use as a transmitting and/or receiving optical system in optoelectronic sensors, comprises at least one diffractive optical element integrated into transparent material, with the unit formed by the transparent material and the diffractive optical element having at least two different functions such as, for example, image forming functions, polarization, beam division, beam forming, beam shaping and/or the provision of a subaperture.

5 Claims, 3 Drawing Sheets

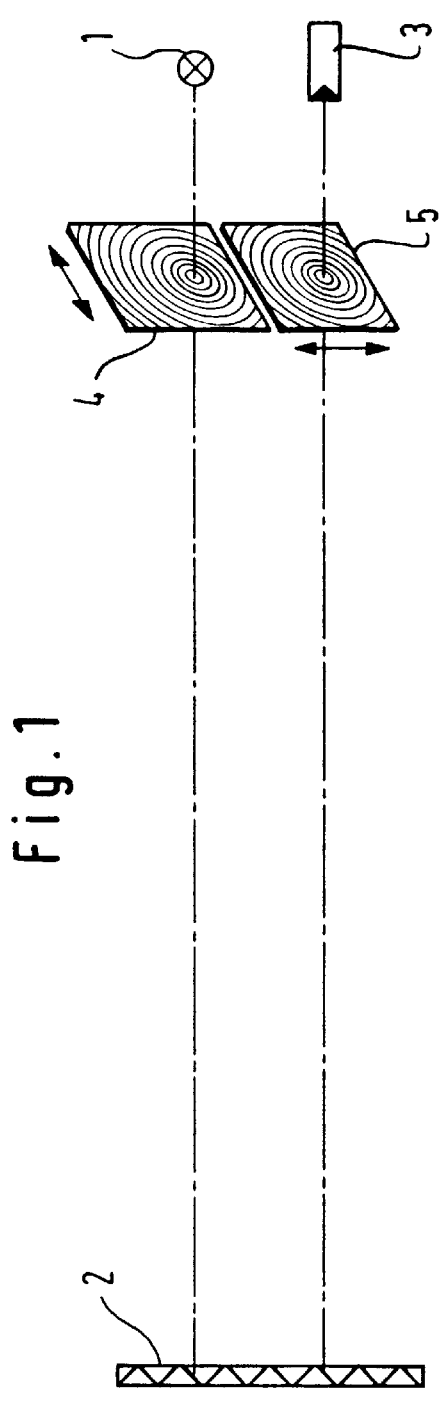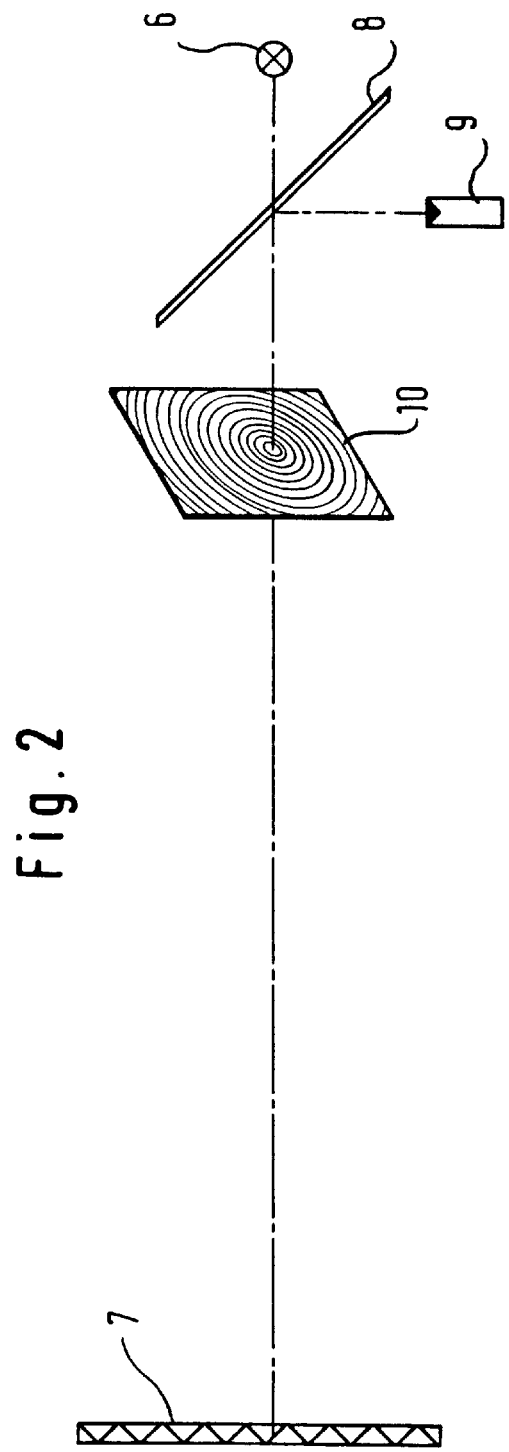

OPTICAL ARRANGEMENT WITH A DIFFRACTIVE OPTICAL ELEMENT

FIELD OF THE INVENTION

The invention relates to an optical arrangement, in particular for use as a transmitting and/or receiving optical system in optoelectronic sensors.

DESCRIPTION OF PRIOR ART

In known optical arrangements, which are, for example, used in optoelectronic sensors, it is frequently necessary to simultaneously realize a plurality of optical functions. For example, with light barriers, which operate with polarized light, it is necessary to provide a polarizing filters in addition to the respective image forming functions of the transmitting optical system and of the receiving optical system, with the polarizing filters of the transmitting and receiving optical systems being orientated perpendicular to one another. A design of this kind makes it necessary to provide two optical elements in both the transmitting optical system and also in the receiving optical system, namely on the one hand the image forming optical system, and on the other hand the said polarizing filter.

The disadvantage of these optical arrangements is consequently the fact that a plurality of components must also be used when realizing different optical functions. This is, on the one hand, associated with considerable costs, and, on the other hand, with a relatively large space requirement.

SUMMARY OF THE INVENTION

An object of the invention is to provide an optical arrangement of the initially named kind which can be economically manufactured and can be accommodated in the smallest space.

This object is satisfied in accordance with the invention in that at least one diffractive optical element is provided which is integrated into transparent material, with at least two different optical functions such as image forming functions, polarization, beam division, filtering, phase shifting, beam shaping, beam profiling and/or the provision of a sub-aperture being realized by the unit formed by the transparent material and the diffractive optical element.

Thus, two or more optical functions are simultaneously integrated here into a single optical element, whereby the number of components required and thus also the costs associated with the manufacturing process can be reduced. At the same time, the aim of a reduced space requirement is achieved.

In addition to the named advantages, it is also possible with the invention to achieve the following:

that the optical arrangement ultimately has a lower weight, that the components which form the optical arrangement no longer have to be adjusted relative to one another in a complicated manner, because they are integrated into a single optical element and are thus already non-movably positioned relative to one another during the manufacturing process, and that separate holders for the individual optical elements are avoided because, as a rule, only a single optical element has to be mounted, namely the element in accordance with the invention which simultaneously realizes a plurality of optical functions.

It is preferred when, in the unit formed by the transparent material and the diffractive optical element, the transparent material realizes at least a first optical function and the diffractive optical element realizes at least a second optical function. For example, the transparent material can be formed as a polarizing filter (linearly or circularly polarizing) and the diffractive optical element can be formed as a Fresnel lens.

In the context of the invention, a transparent material consisting at least in part of plastic, cellulose acetate butyrate, acrylic glass, PMMA and/or polycarbonate is preferably used. In this respect, it is in many applications sensible to form this transparent material as a foil, because this can be manufactured at favorable cost and only requires an extremely small amount of space. In the same way it is, however, possible to use a rigid plate material, for example acrylic glass plates.

In a series of applications the transparent material can be built up layer-wise. For example, a foil or plate with polarizing or phase-shifting characteristics can be embedded between two transparent carrier layers. The diffractive optical element is, in these cases, introduced into one or into both of the carrier layers in order, in this way, not to impair the polarizing or phase-shifting characteristics.

The diffractive optical element can be introduced by a hot pressing process into the transparent material or into the carrier layer or can be produced by injection molding. In this case, the diffractive optical element satisfies at least a first optical function, whereas the transparent material or the middle layer of the transparent material can satisfy at least one second optical function.

In this respect, it is possible to form the transparent material, for example, as a polarizing filter and/or as a phase-shifting filter or as a delay element and/or as a spectral filter.

With a layer-wise build-up of the transparent material with a middle layer and two carrier layers, the carrier layers can also realize further optical functions in addition to and differing from the optical function of the middle layer. It is conceivable here, for example, to have a spectral filtering which can, for example, be achieved by a colored carrier layer. Furthermore, the carrier layer can also be formed by a customary lens, the plane side of which faces the middle layer, with it being possible to impress the diffractive structure into this lens. Finally, an optical termination can also be realized by the carrier layer. The above functions are merely listed by way of example. Many further functions are also conceivable.

The diffractive optical element can satisfy at least one further optical function. Image forming functions, beam dividing functions, beam forming functions or beam shaping functions are conceivable here, among others. In addition to the named purposes, the diffractive optical element can be formed as a suitable diffracting and/or refracting structure and can optionally be formed as a Fresnel lens.

A preferred application of the invention in light barriers resides in realizing the optical functions that are required by forming the transparent material as a polarizing filter, into which there is integrated a Fresnel lens which takes on the image forming function. The optical function of a Fresnel lens of this kind is based on the principle of light diffraction or of a suitable weighting of light diffraction and light refraction.

In autocollimation light barriers, the diffractive optical element can be formed by suitable structuring in such a way that a beam dividing action is achieved by corresponding light division into different orders of diffraction. In this application, in particular, it is possible to achieve a particularly space saving and cost favorable arrangement.

The diffractive optical element is customarily formed as a microstructure, with the size of the structure element spacing lying in the range of the light wavelength and also amounting to somewhat more than the light wavelength. When using a microstructure of this kind, both refraction and also diffraction take place. When realizing the microstructures as grid structures in the form of a surface relief, it is possible to realize very complicated optical functions. It is, in this respect, particularly advantageous that optical components can be manufactured with very small dimensions.

In a modern optoelectronic apparatus, it can be an advantage to arrange the optical arrangement of the invention adjacent to or on a transmitting chip or adjacent to or on a light emitting diode/photodiode. In particular, the optical arrangement of the invention can be integrated into the light emitting or light permeable region of an LED/photodiode. In this manner, the required optical functions can already be realized during the manufacture of the LED/photodiode, or of the transmitting chip, which, on the one hand, is favorable cost-wise and space saving and, on the other hand, makes any form of adjustment unnecessary, since here the optical elements are not only already adjusted relative to one another, but rather the adjustment between the light source and the optical element already takes place during manufacture. It is, furthermore, advantageous, in this case, that the adjustment that is required is invariable so that a later adjustment at a later point in time is superfluous. In this connection, it is also conceivable to integrate an optical arrangement into the light emitting or light permeable region of an LED/photodiode, which solely satisfies a single optical function.

The arrangement of the invention can be used in this manner for many purposes, in particular, it is usable both in optical systems which are based on the principle of autocollimation and also in optical systems with pupil division.

The use of the optical arrangement of the invention in an optoelectronic sensor with a transmitting optical system and a receiving optical system is particularly advantageous. Here, both the transmitting optical system and also the receiving optical system can consist of a polarizing foil filter in which the respectively required image forming characteristics of the transmitting optical system and of the receiving optical system are realized in each case in the form of a diffractive optical element, with the polarizing foil filters of the transmitting and receiving optical system being polarized perpendicular to one another. An optoelectronic sensor formed in this way is characterized by low manufacturing costs, by low constructional size, by low weight and by a considerable reduction of the adjustment work that is required.

The use of an optical arrangement in accordance with the invention in light grid arrangements which have a plurality of sensors arranged in series with the sensors being equipped with respective, adjacently disposed transmitting and receiving optical systems, is particularly advantageous. In such light grids at least a part of the transmitting and/or receiving optical systems for all the sensors can be integrated into a total of two polarizing foil filter strips arranged above one another and polarized perpendicular to one another. In this arrangement, the first polarizing foil filter strip is provided with a respective aperture in those regions in which the diffractive transmitting optical systems are introduced into the oppositely disposed, second polarizing foil filter strip. Analogously, the second polarizing foil filter strip has a respective aperture in those regions in which the oppositely disposed, first polarizing foil filter strip is provided with the diffractive receiving optical systems.

In this manner, the total optical system of a light grid can be manufactured in that transmitting and receiving optical systems are, for example, pressed into two differently orientated polarizing foil filter strips, with the said apertures being capable of being subsequently manufactured, for example, by means of a punching procedure. When the two polarizing foil filter strips, which are, for example, manufactured in this way, are laid on top of one another, then the transmitting and receiving optical system of the entire light grid arrangement can be realized with this double foil strip. This represents a considerable simplification of the manufacturing process in comparison to the previously known arrangements, with a simultaneously significantly reduced space requirement.

Further preferred embodiments of the invention are set forth in the subordinate claims.

BRIEF DESCRIPTION OF THE DRAWINGS

FIG. 1 is a diagram illustrating the principle of a light barrier formed in accordance with the invention with pupil division, FIG. 2 is a light barrier formed in accordance with the invention and based on the autocollimation principle.

DETAILED DESCRIPTION OF THE PREFERRED EXEMPLARY EMBODIMENTS

Figure 4:
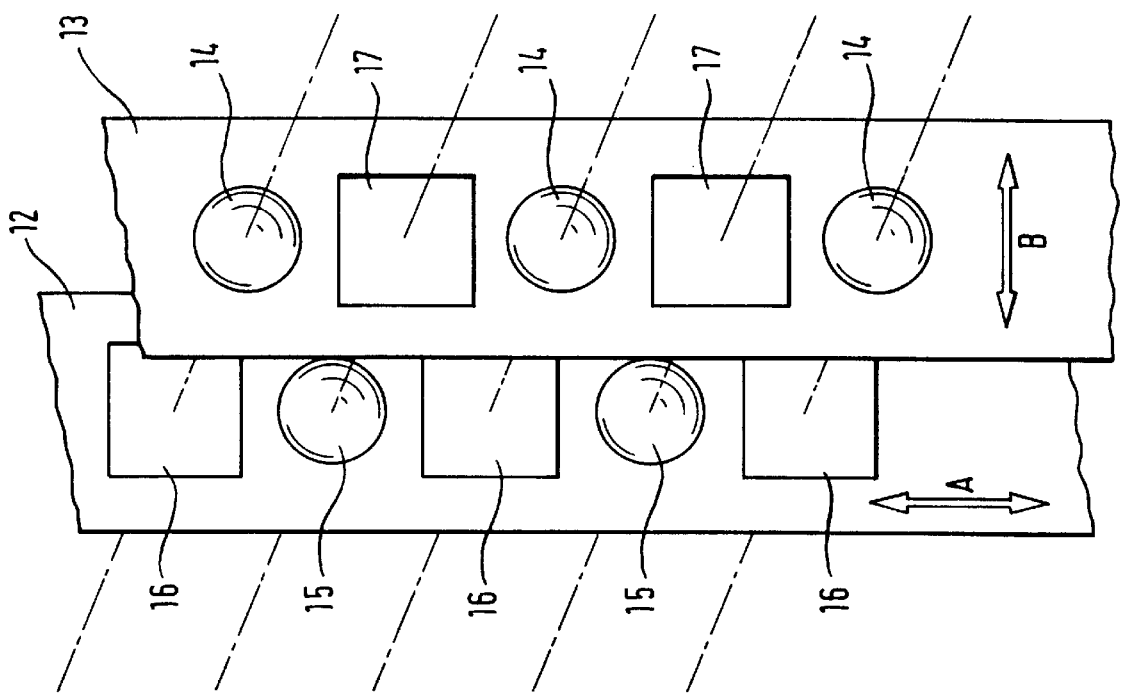
FIG. 4 is a diagram illustrating the principle of an arrangement in accordance with the invention for use in light grids.

The light barrier shown in FIG. 1 consists of a light transmitter 1 which radiates light in the direction towards a reflector 2, with the reflector 2 reflecting the light radiated by the light transmitter 1 back to a light receiver 3 arranged adjacent to the light transmitter 1.

The light emitted by the light transmitter 1 passes through a linearly polarizing filter foil 4 which polarizes in the direction shown by the arrow. A diffractive optical structure formed as a Fresnel lens has been impressed into the linearly polarizing foil filter. The linearly polarizing foil filter 4 thus takes on both the function of polarizing the light transmitted by the light transmitter 1 and also the image forming functions required on transmission of the light.

In analogous manner, a further linearly polarizing filter foil 5 is inserted in front of the light receiver 3, with its polarization direction extending in accordance with the arrow shown perpendicular to the polarizing direction of the linearly polarizing foil filter 4. A diffractive optical structure, which is likewise formed as a Fresnel lens, is worked into the linearly polarizing foil filter 5 arranged in front of the light receiver 3 and takes on the image forming functions required during the reception of the reflected light.

Through the light barrier shown in FIG. 1, an apparatus is provided which can be manufactured at favorable cost, which takes up little space and in which the total required optical functions can be taken on by the two foil elements 4, 5.

FIG. 2 shows an autocollimation light barrier comprising a transmitter 6 which radiates light in the direction of a reflector 7 which reflects the light back along the transmitted light path, with the light reflected back striking a beam divider 8 which deflects the received light in the direction of a light receiver 9.

The region to be monitored with the illustrated autocollimation light barrier is bounded at one side by the reflector 7 and at the other side by a circularly polarizing filter 10.

A diffractive structure, which can, for example, be formed as a Fresnel lens, is worked into the circularly polarizing foil filter 10.

The circularly polarizing foil filter 10 thus takes on both the function of polarizing the transmitted light and also the function of polarizing the received light. In addition, the circularly polarizing foil filter 10 takes on the image forming functions required during transmission and reception of the light.

In this manner, an extremely space saving and cost favorable arrangement is provided, in which a plurality of optical functions are integrated into a single foil element 10.

In an advantageous embodiment of an autocollimation light barrier, not shown in the drawings, the diffractive optical element can be designed by suitable structuring in such a way that a beam dividing action can also be achieved by corresponding light distribution into the orders of diffraction, whereby a further reduction of the number of the components that are required can be achieved.

Figure 3:
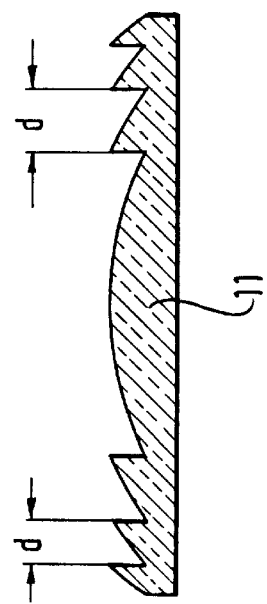
FIG. 3 is a cross-section through an optical arrangement in accordance with the invention.

FIG. 3 shows a greatly enlarged cross-section through a polarizing foil filter processed in accordance with the invention, such as can, for example, be used in the context of a light barrier in accordance with FIG. 1.

The structure element spacings of the polarizing foil filter 11 are so selected in the embodiment shown in FIG. 3 that ultimately a typical Fresnel structure results.

FIG. 4 shows two polarizing foil filter strips 12, 13 which—in so far as they are placed on top of one another and correctly aligned—can be used as the transmitting and receiving optical system of a light grid arrangement. The polarizing foil filter strip 12 is polarized in the direction of the arrow A, whereas the polarization direction of the polarizing foil filter strip 13 extends perpendicular to this in the direction of the arrow B. The direction of polarization B of the polarizing foil filter strip 13 thereby corresponds to the direction of polarization of the transmitted light, and the direction of polarization A of the polarizing foil filter strip 12 corresponds to the direction of polarization of the received light.

Diffractive optical elements 14 are worked into or impressed into the polarizing foil filter strips 13 at equidistant intervals and take on the image forming functions of the optical transmission system. In this respect, precisely one transmitter element of the light grid is associated with each diffractive optical element 14.

The polarizing foil filter strip 12 is provided in corresponding manner with diffractive optical elements 15, which take on the image forming function of the optical receiving system. In this respect, one diffractive optical element 15 is associated with each receiving element of the light grid.

If two polarizing foil filter strips 12, 13 are so placed on top of one another so that they cover one another, then they have to be so aligned that the diffractive optical transmitter elements 14 alternate with the diffractive optical receiving elements 15 and the elements 14 and 15 may not overlap.

In order to be able to realize the functions desired in a light grid, it must be ensured that an image is formed of the transmitted light beam by a diffractive optical transmitting element 14 and is polarized in the direction of the arrow B, with the two said functions being satisfied by the polarizing foil filter strip 13. In the region of a transmitted light beam passing through a diffractive optical element 14, the polarizing foil filter strip 12 may thus have no effect on the light beam, which is why this polarizing foil filter strip 12 is provided with apertures 16 in the corresponding regions. When the polarizing foil filter strips 12, 13 are placed above one another, an aperture 16 is thus, in each case, provided in the polarizing foil filter strips 12 in those regions which lie opposite to the diffractive optical transmitting elements 14.

The polarizing foil filter strip 13 is also provided with apertures 17, because a corresponding situation must be ensured with the received light beams. The apertures 17 now again lie opposite to those regions of the polarizing foil filter strip 12, in which the diffractive optical receiving elements 15 are provided.

Thus, diffractive optical elements 14, 15 and apertures 16, 17 are respectively alternatingly arranged in a row or series in the two polarizing foil filter strips 12, 13. In this respect, the areal extent of each aperture 16, 17 in a polarizing foil filter strip 12, 13 can be larger than the areal extent of the diffractive optical element 14, 15 of the other polarizing foil filter strip 13, 12 associated with the respective aperture 16, 17. It is preferred when the areal extent of each aperture 16, 17 in a polarizing foil filter strip 12, 13 is approximately precisely as large or fractionally larger than the areal extent of the diffractive optical element 14, 15 of the other polarizing foil filter strip 13, 12 associated with the respective aperture 16, 17. In this case, an effective filtering out of stray light is achieved by the crossed polarizing foil filter strips 12, 13.

In this manner, the total transmitting and receiving optical system of a light grid can be realized by two polarizing foil filter strips 12, 13 arranged above one another.

Figure 5:
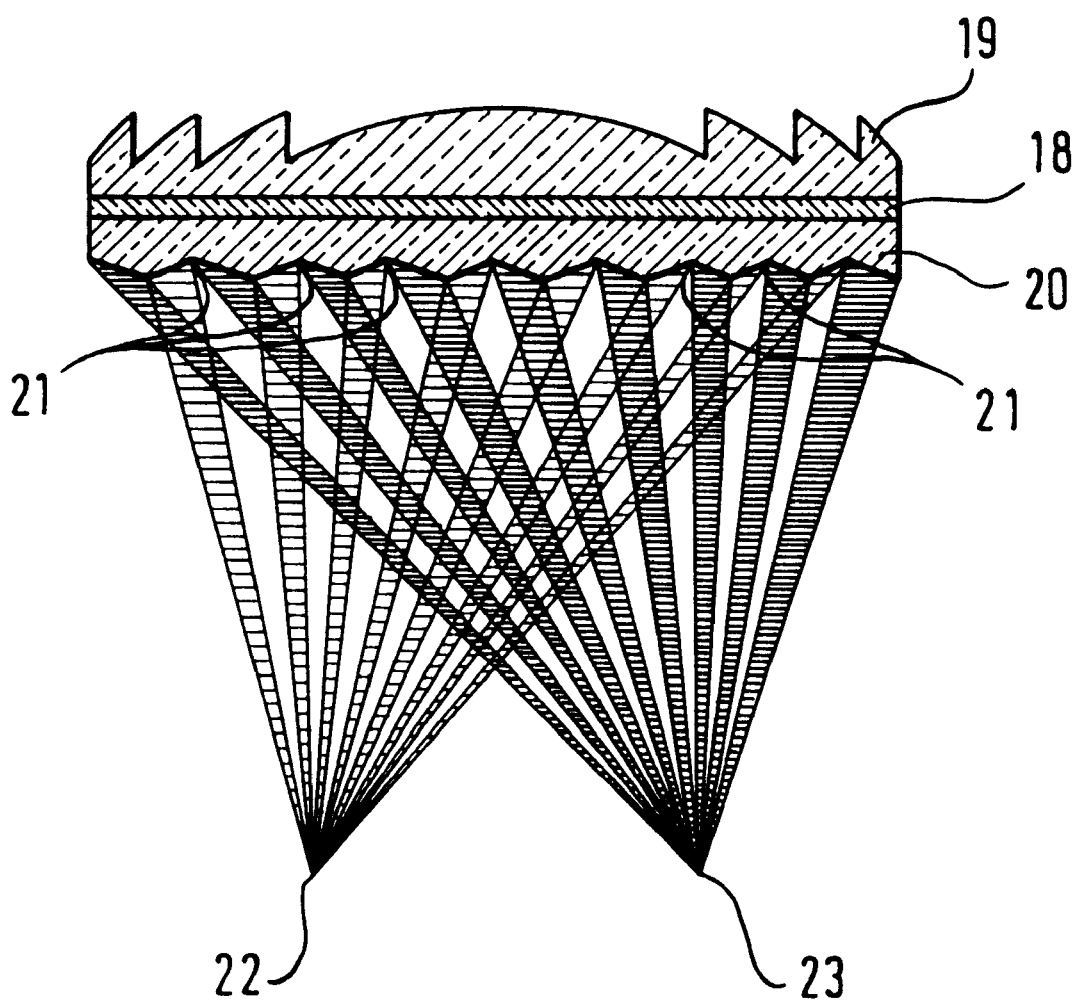
FIG. 5 is a sectional view of an optical arrangement in accordance with the invention built up layer-wise.

FIG. 5 shows a sectional view of an optical arrangement in accordance with the invention which is built up layerwise.

The arrangement consists, in particular of three layers arranged above one another, with the middle layer 18 being formed by a polarizing filter or delay foil, which is embedded between two carrier layers 19, 20. The carrier layers 19, 20 in each case have one flat side, which respectively confronts the middle layer 18. Both carrier layers 19, 20 are transparent.

The upper carrier layer 19 is provided with a typical Fresnel structure, such as is also shown in FIG. 3.

The lower carrier layer 20 is processed at its lower side in such a way that a plurality of adjacent ridge-like grooves 21 are formed, which ultimately lead to a beam dividing action, which is illustrated by the two light beams shown in FIG. 5 in differently hatched representations, which are respectively focused to different focal points 22, 23.

An additional optical function of the arrangement shown in FIG. 5 can, for example, be realized if the lower carrier layer 20 is colored red so that a colored optical edge filter results.

The invention is not restricted to the above described applications and embodiments. A large number of other applications and embodiments are conceivable.

What is claimed is:

1. A light grid arrangement, comprising:

a plurality of transmitting and/or receiving optical systems; each of the systems including at least one diffractive optical element integrated into transparent material, with at least two different optical functions being realized by a unit including the transparent material and the diffractive optical element; and a plurality of sensors arranged in series with respective transmitting and/or receiving optical systems arranged alongside one another, wherein at least a part of the transmitting and/or receiving optical systems for all sensors is integrated into a total of two polarizing foil filter strips, which lie above one another and which polarize perpendicular to one another, with the first polarizing foil filter strip having an aperture in regions where diffractive optical elements are integrated into the second polarizing foil filter strip, and wherein the second polarizing foil filter strip has in each case an aperture in regions where the receiving diffractive optical elements are integrated into the first polarizing foil filter strip.

2. A light grid arrangement in accordance with claim 1, wherein the at least two different optical functions that are realized comprise at least two from the group consisting of image forming functions, polarization, beam division, filtering, phase shifting, beam shaping, beam profiling and a provision of subaperture.

3. A light grid arrangement in accordance with claim 2, wherein the at least two different optical functions that are realized are an image forming function and polarization.

4. A light grid arrangement in accordance with claim 1, characterized in that the diffractive optical elements and the apertures are in each claim arranged alternatingly in a row in the polarizing foil filter strips.

5. A light grid arrangement in accordance with claim 1, characterized in that an areal extent of each aperture in a polarizing foil filter strip is approximately matched to a size of an areal extent of the diffractive optical element of the other polarizing foil filter strip associated with each aperture.

* * * * *